C. T. PORTER & R. J. OSBORNE.
ANTISEPTIC PROTECTOR FOR MOUTHPIECES.
APPLICATION FILED JUNE 18, 1913.
1,076,908.
Patented Oct. 28, 1913.
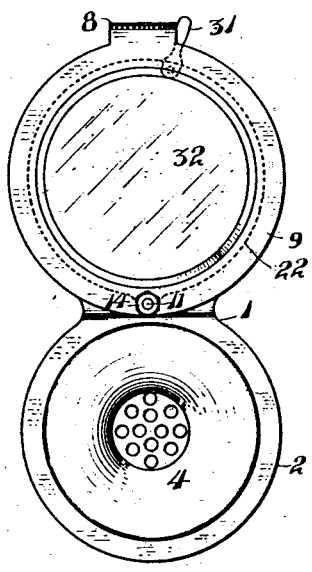
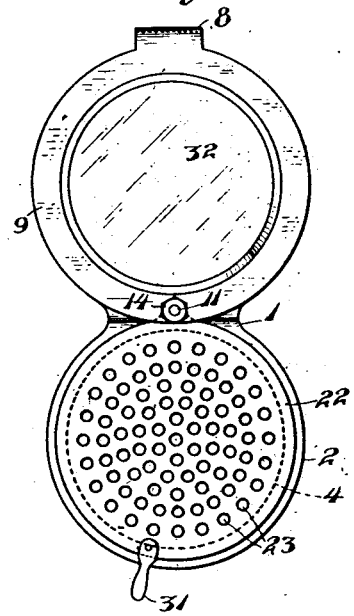
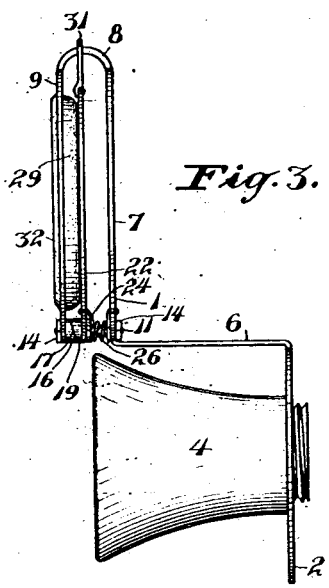
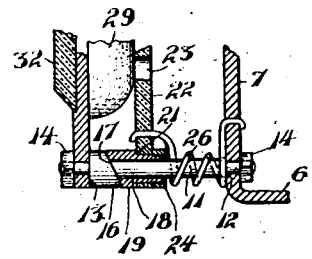
WITNESSES:
F. C. Fliedner
G. M. Ball
INVENTORS
Charles T. Porter
Reginald J. Osborne
BY Francis M. Wright
ATTORNEY

UNITED STATES PATENT OFFICE.

CHARLES T. PORTER AND REGINALD J. OSBORNE, OF SAN FRANCISCO, CALIFORNIA.

ANTISEPTIC PROTECTOR FOR MOUTHPIECES.

1,076,908.  Specification of Letters Patent.  Patented Oct. 28, 1913.

Application filed June 18, 1913. Serial No. 774,358.

*To all whom it may concern:*

Be it known that we, CHARLES T. PORTER and REGINALD J. OSBORNE, citizens of the United States, residing at San Francisco, in the county of San Francisco and State of California, have invented new and useful Improvements in Antiseptic Protectors for Mouthpieces, of which the following is a specification.

The object of the present invention is to provide a convenient, durable, efficient and easily replenishable antiseptic protector for mouthpieces of telephones and the like.

A further object is to provide a device of this character which will serve also as a mirror support or as an advertising medium.

In the accompanying drawing, Figure 1 is a front view of the device attached to a telephone mouthpiece and in its normal or inoperative position; Fig. 2 is a similar view of the device in its operative position; Fig. 3 is a side view of the device; Fig. 4 is an enlarged detail vertical sectional view.

Referring to the drawing, 1 indicates the main body of our device, made of sheet material, preferably metallic. It comprises a lower portion 2 having a central hole to enable it to fit around the neck of a mouthpiece 4, and be clamped between said mouthpiece and the transmitter casing, not shown, a forwardly extending portion 6 above, and of substantially the same length as, the mouthpiece, a substantially circular rear member 7, rising from the front end of said forwardly extending portion 6, an overhanging bridge 8, and a substantially circular front member 9, depending from the front end of said overhanging member 8. The lower portions of said circular members 7 and 9 are connected by a pivot bolt 11, passing through holes therein and having shoulders 12, 13 abutting against the inner or opposing surfaces of said members 7 and 9. Nuts 14 are screwed upon the threaded outer ends of the bolt. Near the outer member said bolt is enlarged, as shown at 16, the inner edge of said enlarged portion being formed with an oblique shoulder 17. On the pivot bolt near said enlarged portion is a sleeve 18 having at one end an enlarged portion 19 with an oblique outer end, and at the inner end a shoulder 21, said sleeve being threaded at the other end. On the sleeve is secured a circular disk 22, preferably of glass, formed with a large number of small holes 23. Said disk is clamped against the shoulder 21 by a nut 24 screwed on the threaded end of the sleeve. A spring 26 is coiled around the rear portion of the pivot bolt 11, one end extending into one of the holes in the disk, while the other end passes through a small hole in the rear member 7. Said spring being compressed between the nut 24 and the member 7 normally presses the disk forward. Upon the rear surface of the front member 9 is secured a pad 29 of absorbent material which is supplied with antiseptic liquid.

The device is used in the following manner. When it is desired to speak through the mouthpiece, the disk is drawn to its lowermost position by means of a small handle 31 secured to its margin. Upon releasing the handle the spring returns the disk to its upper position, and at the same time presses it forward against the absorbent pad, this forward movement being permitted by the oblique shoulders of the bolt and sleeve.

The front face of the front member 9 forms an excellent medium for advertising purposes, or, if desired, it may form a support for a mirror 32.

It will now appear from the above description that the device is very cheap and simple in construction, and also effective in use, since the front surface of the apertured glass disk is, each time it is used, brought into fresh contact with antiseptic material and remains in contact during disuse. Moreover, the absorbent pad is covered, except at its circular edge, by the apertured disk, so that there is very little evaporation of the antiseptic liquid when the device is not being used; also the pad can readily be replenished with antiseptic liquid when necessary. The device can be installed at a profit without cost to the user on account of its excellence as an advertising medium. Or, if preferred, the device can be used as a mirror as well as an antiseptic protector.

We claim:—

1. An antiseptic protector for mouthpieces, comprising a body portion secured upon the mouthpiece and extending forwardly, an absorbent pad secured to the rear surface of the front portion of said body, a circular apertured disk pivotally supported by the body portion and arranged in one position of its pivotal movement to be in contact with the rear surface of the absorbent pad, and a spring for pressing said disk against said pad.

2. An antiseptic protector for mouthpieces comprising a main body portion of sheet metal having a lower apertured portion arranged around the neck of the mouthpiece, a portion extending forwardly therefrom, a member extending upwardly from the front end of the forwardly extending portion, a front member extending depending from the upper portion of said first-named member, and spaced therefrom, an antiseptic pad secured upon the rear surface of said front member, a pivot bolt connecting the lower portions of said front and rear members, an apertured disk rotatable upon said pivot, and a spring coiled around the shaft and arranged to press said disk against said pad.

3. An antiseptic protector for mouthpieces comprising a main body portion of sheet metal having a lower apertured portion arranged around the neck of the mouthpiece, a portion extending forwardly therefrom, a member extending upwardly from the front end of the forwardly extending portion, a front member extending depending from the upper portion of said first-named member, and spaced therefrom, an antiseptic pad secured upon the rear surface of said front member, a pivot bolt connecting the lower portions of said front and rear members, and having an enlarged portion formed with an oblique rear shoulder, an apertured disk rotatable upon said pivot and having a forward oblique shoulder, and a spring coiled around the shaft and arranged to press said disk against said pad.

In testimony whereof we have hereunto set our hands in the presence of two subscribing witnesses.

CHARLES T. PORTER.
REGINALD J. OSBORNE.

Witnesses:
FRANCIS M. WRIGHT.
D. B. RICHARDS.